No. 667,146. Patented Jan. 29, 1901.
W. L. GARRELS & C. KIMBALL.
STEERING GEAR FOR VEHICLES.
(Application filed Dec. 29, 1899.)
(No Model.) 2 Sheets—Sheet 1.
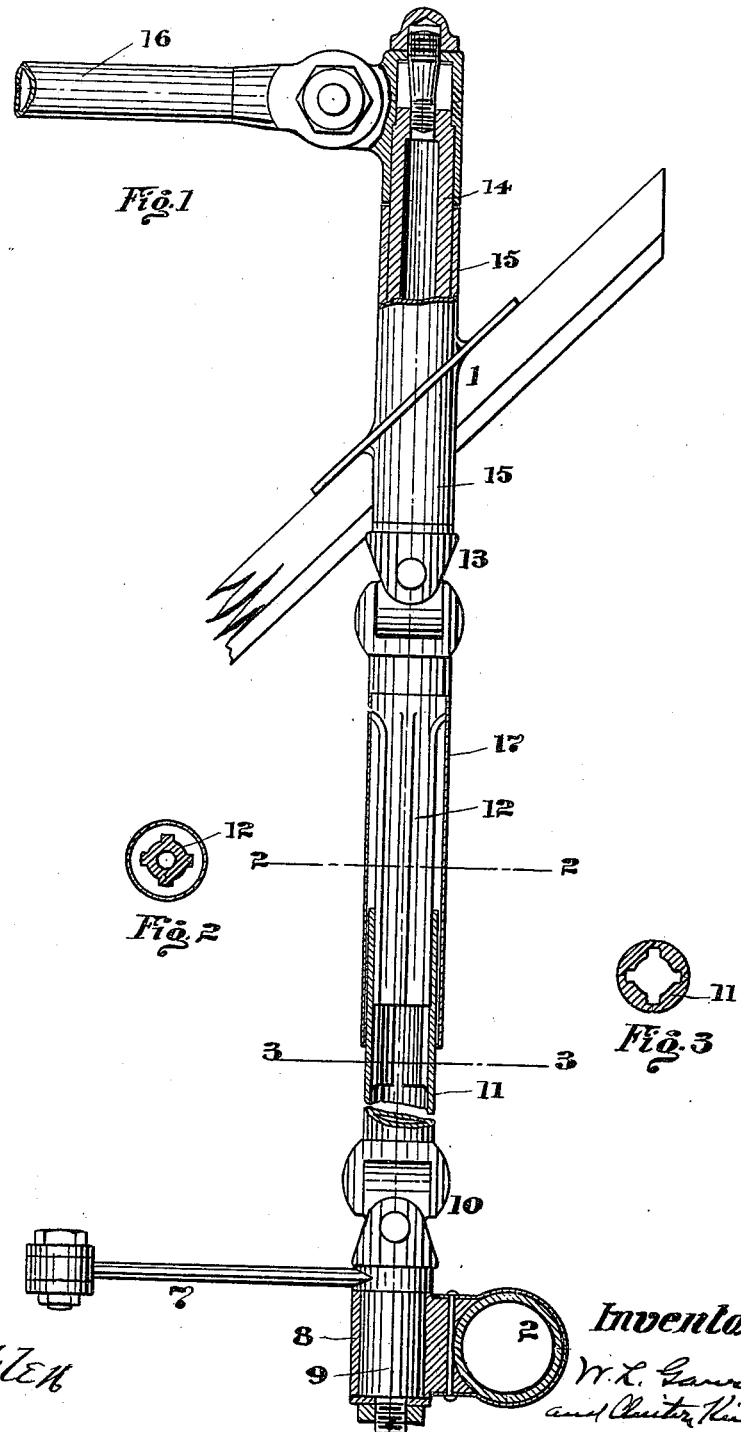

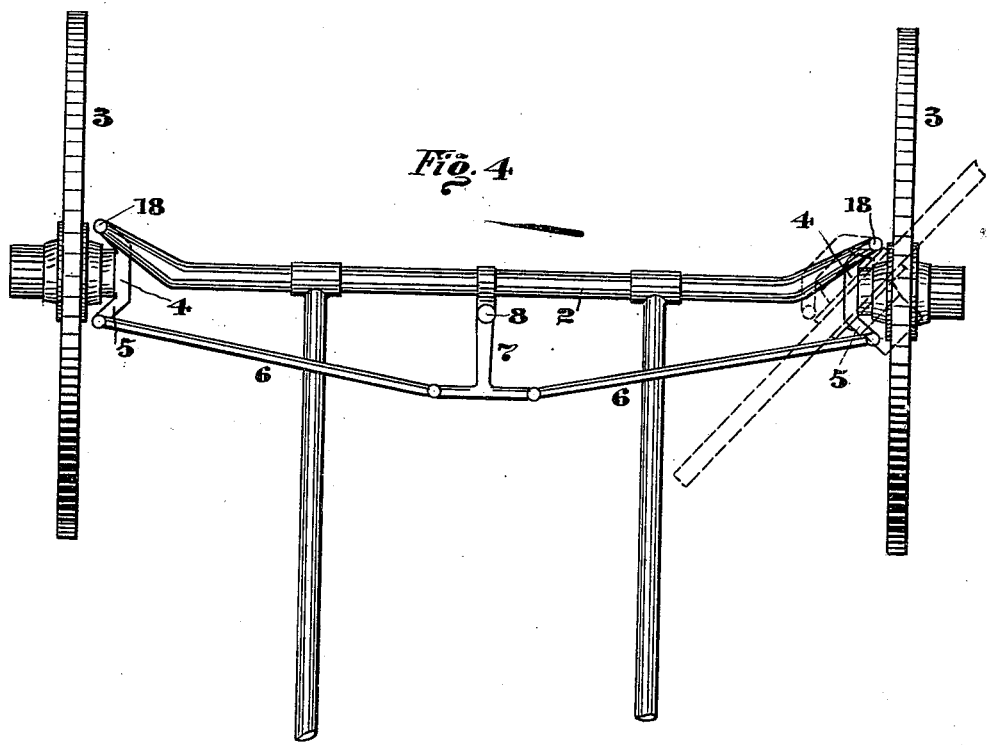

UNITED STATES PATENT OFFICE.

WILLIAM L. GARRELS, OF ST. LOUIS, AND CLINTON KIMBALL, OF KIRKWOOD, MISSOURI.

STEERING-GEAR FOR VEHICLES.

SPECIFICATION forming part of Letters Patent No. 667,146, dated January 29, 1901.

Application filed December 29, 1899. Serial No. 741,942. (No model.)

*To all whom it may concern:*

Be it known that we, WILLIAM L. GARRELS, residing in the city of St. Louis, and CLINTON KIMBALL, residing at Kirkwood, St. Louis county, Missouri, citizens of the United States, have invented a new and useful Improvement in Steering-Gears for Vehicles, of which the following is a specification.

Our invention relates to the steering-gear of vehicles, and has for its principal objects to reduce the tendency of obstructions to turn the wheels from their course and to give the wheels a tendency to revert to a proper normal position when deflected therefrom.

Our invention consists in journaling the wheels upon spindles pivotally mounted to have a small turning moment-arm.

It also consists in pivoting the wheel-spindles forward of the spindle-axis.

It also consists in devices hereinafter described and claimed.

In the accompanying drawings, which form part of this specification, and wherein like symbols refer to like parts wherever they occur, Figure 1 is a central vertical view, mostly in section, of our steering-gear. Fig. 2 is a detailed section of the upper member of the extensible connecting-link and the mud-guard thereon on the line 2 2 of Fig. 1. Fig. 3 is a detailed section of the lower member of the extensible link on the line 3 3 of Fig. 1. Fig. 4 is a plan view of our gear.

Our steering-gear comprises two main portions, one portion being mounted to move with the body of the vehicle (indicated at 1 in Fig. 1) and the other portion being mounted on the front axle 2. The front wheels are journaled on short spindles 4, pivoted at each end of the front axle to swing horizontally. These spindles are provided with lever-arms 5 for turning them, and these lever-arms are connected by rods 6 to a lever or crank-arm journaled in a bearing 8, fixed to the front axle to swing horizontally. The shaft 9, which carries the crank-arm, is connected by a universal joint 10 to a tube 11, arranged to telescope with a tube 12, which is likewise connected by a universal joint 13 to a shaft or spindle 14. This shaft extends up through bearing 15, fixed to the body of the vehicle, and is equipped with a hand-lever or crank-arm 16 for turning it. The telescoping tubes are equipped, respectively, with interlocking ribs and grooves, as shown, or are otherwise interlocked to transmit rotary motion from the upper to the lower member of the link, which they together constitute. It is desirable to mount the tubular casing 17 upon the inner telescoping member of such size as to incase and clear the other member, and thus constitute a mud-guard for protecting the joint.

As stated above, the front wheels are journaled on short spindles pivotally secured to the front axle. The object of this arrangement is to reduce the tendency of the wheel to change the direction of its motion when it strikes an obstruction, for the turning moment is proportional to the moment-arm—that is, the perpendicular distance between planes parallel to the line of motion and passing through the center of the wheel and the pivot on which the spindle or axle is swiveled. In order to shorten this moment-arm, the spindle is bent forwardly to clear the hub of the wheel and then turned back toward the wheel, so that its pivot-axis 18 will lie as close as practicable to the spokes of the wheel. By this arrangement the moment-arm of an ordinary wooden wheel is even less than it would be if the pivot-axis of the spindle were flush with the inner end of the hub, so that the arrangement is almost equivalent to mounting the pivot-pin midway of the hub. It is noted that in this arrangement the pivot of the spindle is in front of the spindle-axis and to the side of the medial plane of the wheel. Consequently when the wheel meets an obstruction and is swung on the pivot-pin of the spindle there is a lateral movement of the wheel-hub toward the plane of the pivot-pin—that is, the moment-arm of the force tending to deflect the wheel decreases to zero, whereupon the tendency to further deflection of the wheel vanishes. In the meanwhile the opposite wheel is correspondingly deflected; but in its case the moment-arm increases instead of decreases and acts in the opposite direction. Thus while the turning or deflecting moment acting on one wheel decreases the resisting moment acting on the other wheel increases, so that when the obstruction is overcome the wheels tend immediately to turn back into normal position and to move in a straight line. Other important advantages are that this construction permits of the use of an ordinary hub and that the wheels remain vertical in turning except in case the pivot-pin is mounted in an inclined position, as such pin may obviously be mounted.

Another important advantage is that the vibration or jarring due to obstructions or roughness of the roadway and which in the ordinary forms of steering-gears are transmitted to the steering-handle are deadened to a minimum.

What we claim is—

1. A vehicle comprising pivotally-mounted wheel-spindles and means for manipulating said spindles from within the vehicle-body, the pivot-pin of each spindle being forward of the hub of its wheel, substantially as described.

2. A vehicle comprising pivotally-mounted wheel-spindles and means for manipulating said spindles from within the vehicle-body, the pivot-pin of each spindle being outside of the hub and forward of the spindle-axis, substantially as described.

3. A vehicle comprising pivotally-mounted wheel-spindles and means for manipulating said spindles from within the vehicle-body, the pivot-pin of each spindle being forward of the hub of its wheel and said manipulating devices being arranged to turn said spindles unequal angles, substantially as described.

4. A vehicle comprising pivotally-mounted wheel-spindles and means for manipulating said spindles from within the vehicle-body, the pivot-pin of each spindle being forward of its axis and out of the medial plane of the wheel, substantially as described.

5. A vehicle comprising pivotally-mounted wheel-spindles and means for manipulating said spindles, said spindles each having a part projecting forward of its axis to its pivot-pin and having a rearwardly-projecting portion constituting a lever-arm for connection to the manipulating devices, the pivot-pin being outside of the hub of the wheel, substantially as described.

6. A vehicle comprising an axle having its end portions turned forward, wheel-spindles pivotally mounted thereon and means for manipulating said spindles, the pivot-pin of each spindle being forward of its axis and said spindles being in alinement with said axle when the planes of the wheels are perpendicular to the axis of said axle, the pivot-pin being outside of the hub of the wheel, substantially as described.

7. A vehicle comprising pivotally-mounted wheel-spindles, the inner end of each spindle extending forwardly and outwardly to engage the pivot-pin forward of the spindle-axis and close to the wheel, substantially as described.

8. A vehicle comprising a front axle and wheel-spindles pivotally mounted at the ends thereof and forward of their axes, lever-arms extending rearwardly from said spindles, rods connecting said lever-arms to a crank-arm mounted on the running-gear to swing horizontally, a handle-shaft turning in bearings on the vehicle-body, and a device for connecting said shafts consisting of an extensible link and two universal joints, substantially as described.

9. A vehicle comprising a front axle and wheel-spindles pivotally mounted at the ends thereof and forward of their axes, lever-arms extending rearwardly from said spindles, rods connecting said lever-arms to a crank-arm mounted on the running-gear to swing horizontally, an extensible link connected by a universal joint to the shaft of said crank-arm, a handle-shaft mounted to turn in bearings provided therefor on the vehicle-body and a universal joint connecting said shaft and said link, substantially as described.

10. In a steering-gear, a link comprising telescoping members, the one member carrying a casing adapted to incase the other member, substantially as described.

11. In a steering-gear, a link comprising telescoping members, the inner member carrying a casing adapted to fit over the outer member, substantially as described.

W. L. GARRELS.
CLINTON KIMBALL.

Witnesses:
PAUL MEHLEN,
JAMES A. CARR.